United States Patent
Hur et al.

(10) Patent No.: US 6,692,721 B2
(45) Date of Patent: Feb. 17, 2004

(54) METHOD FOR PREPARING BARIUM TITANATE POWDER BY OXALATE SYNTHESIS

(75) Inventors: Kang Heon Hur, Suwon (KR); Jai Joon Lee, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 179 days.

(21) Appl. No.: 10/045,103

(22) Filed: Jan. 15, 2002

(65) Prior Publication Data

US 2003/0133869 A1 Jul. 17, 2003

(51) Int. Cl.$^7$ .......................... C01F 11/00; C01G 23/00
(52) U.S. Cl. ..................................................... 423/598
(58) Field of Search .................... 423/598, 71; 501/137

(56) References Cited

U.S. PATENT DOCUMENTS 5,009,876 A * 4/1991 Hennings et al. ........... 423/598
5,445,806 A * 8/1995 Kinugasa et al. ........... 423/598
5,783,165 A * 7/1998 Wilson et al. .............. 423/598
2002/0048547 A1 * 4/2002 Lee et al. ................... 423/598

OTHER PUBLICATIONS

Abstract of Japan 61–146710, Jul. 4, 1986.*

* cited by examiner

*Primary Examiner*—Steven Bos
(74) *Attorney, Agent, or Firm*—Lowe Hauptman Gilman & Berner LLP

(57) ABSTRACT

Disclosed is a method for preparing barium titanate powder by oxalate synthesis, whereby barium titanate powder or doped barium titanate powder with excellent powder properties can be produced at high efficiency and with economic benefit. An aqueous solution containing barium chloride and titanium chloride or further containing at least one dopant serving as a donor or acceptor is mixed with an aqueous oxalic acid solution to afford barium titanyl oxalate (BTO) or doped-BTO as a precipitate which is then aged, washed, and dried, followed by primary calcination and pulverization and secondary calcination and pulverization.

14 Claims, 5 Drawing Sheets

METHOD FOR PREPARING BARIUM TITANATE POWDER BY OXALATE SYNTHESIS

BACKGROUND OF THE INVENTION

1. Field of the Invention

The present invention relates, in general, to the preparation of barium titanate powder for use in ferroelectrics and piezoelectrics and, more particularly, to the preparation of barium titanate powder through oxalate synthesis.

2. Description of the Prior Art

Comparable to ferrite in the materiology of electroceramics, barium titanate ($BaTiO_3$) showing ferroelectric characteristics finds a broad spectrum of applications in multilayer ceramic capacitors, static characteristic thermistors (PTC), piezoelectrics, etc.

Conventionally, barium titanate powder was prepared by reacting titanium oxide with barium carbonate in a solid phase. According to the recent trend toward small-size/large capacitance (by high dielectric constant compositions, and thin- and multi-layering of dielectrics), low-temperature sintering, high frequency and high performance MLCCs, barium titanate powder has been required to be of high purity/composition homogeneity, fine particle/particle size uniformity, and non-coagulation/high dispersibility. To satisfy the requirements, liquid phase synthesis of barium titanate was suggested, which has been developed to hydrothermal synthesis, co-precipitation (oxalate synthesis) and alkoxide synthesis (sol-gel synthesis).

According to the oxalate synthesis, Ba and Ti ions are precipitated to barium titanyl oxalate (BTO) in the presence of oxalate in a solution and the precipitate is dried and thermally decomposed to barium titanate powder.

Referring to FIG. 1, there is illustrated a conventional method for preparing barium titanate powder by oxalate synthesis. As seen in FIG. 1, an aqueous barium chloride solution is mixed with an aqueous titanium chloride solution at a Ba/Ti molar ratio of 1:1 and added with oxalic acid to give barium titanyl oxalate (BTO) ($BaTiO(C_2O_4)_2 \cdot 4H_2O$) as a precipitate which is then washed, dried and filtered, followed by thermolysis at 800° C. or higher to produce barium titanate powder.

Having the advantage of being simple and requiring low material cost and low investment for facilities, the oxalate synthesis process was first commercialized.

However, the oxalate synthesis process is disadvantageous in that it is difficult to control the powder composition (Ba/Ti) and particle distribution. Also, the particles have a strong tendency to aggregate upon thermolysis, resulting in an incomplete pulverization, after which there may remain aggregates as large as ones to tens of $\mu m$ in size. Further, the particles are not well dispersed upon subsequent mixing/forming processes. In addition, the presence of aggregates may result in the formation of abnormal crystal grains at sintering.

Another disadvantage of the conventional oxalate synthesis process is that the powder is not suitable for use in MLCC B characteristics because the grains cannot be grown and shows poor crystallinity owing to the presence of aggregates.

In more recent times, the barium titanate powder prepared in the hydrothermal synthesis process has been substituted for that prepared in the oxalate synthesis process to cope with the requirement for thinning and multiple layering of MLCCs. Despite excellent properties, the barium titanate powder prepared in the hydrothermal synthesis process is not extensively used because the synthesis process is complex and requires the use of autoclaves, leading to poor productivity and expensive product.

Therefore, there remains a need for a method for preparing barium titanate powder at low cost, and with ease.

SUMMARY OF THE INVENTION

It is an object of the present invention to provide a method for preparing barium titanate powder of excellent powder properties by oxalate synthesis, which is of high productivity with high economic advantage.

It is another object of the present invention to provide a method for preparing doped-barium titanate powder of excellent powder properties by oxalate synthesis, which is of high productivity with high economic advantage.

In accordance with an aspect of the present invention, there is provided a method for preparing barium titanate by oxalate synthesis, comprising the steps of: adding an aqueous barium chloride solution and an aqueous titanium chloride solution to an aqueous oxalic acid solution to give barium titanyl oxalate as a precipitate, aging, washing, filtering and drying the precipitate; primarily calcining the barium titanyl oxalate, followed by primary pulverization to afford fine barium titanyl powder; and secondarily calcining the fine barium titanyl powder, followed by secondary pulverization.

In accordance with another aspect of the present invention, there is provided a method for preparing barium titanate by oxalate synthesis, comprising the steps of: dissolving at least one donor or acceptor in a mixture of an aqueous barium chloride solution and an aqueous titanium chloride solution to give a dopant element-containing solution, said donor or acceptor being in a form of oxides, hydroxides, carbonates, nitrides, sulfates or salts, and being selected from the group consisting of Y, La, V, Nb, Ta, Cr, Mo, W, Mn, Fe, Co, Rh, Ni, Cu, Zn, Ga and rare-earth elements; adding the dopant element-containing solution to an aqueous oxalic acid solution to give doped-barium titanyl oxalate as a precipitate, aging, washing, filtering and drying the precipitate; primarily calcining the doped-barium titanyl oxalate, followed by primary pulverization to afford fine doped-barium titanyl powder; and secondarily calcining the doped-fine barium titanyl powder, followed by secondary pulverization.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

In the present invention, an aqueous barium chloride solution and an aqueous titanium chloride solution are added to an aqueous oxalic acid solution to give barium titanyl oxalate (BTO) as a precipitate which is then aged, washed, filtered and dried to produce pure BTO.

Preferably, the aqueous barium chloride solution is in the range of 0.2 to 2.0 mol/l and is prepared by dissolving $BaCl_2.2H_2O$ in water. The titanium chloride solution that can be prepared by diluting a $TiCl_4$ solution preferably ranges in concentration from 0.2 to 2.0 mol/l. The aqueous barium chloride solution is mixed with the aqueous titanium chloride solution at a molar ratio of barium chloride to titanium chloride of 0.9–1.5. The aqueous oxalic acid solution is preferably maintained at 30 to 100° C. with a concentration ranging from 0.2 to 5.0 mol/l.

While being vigorously stirred, the aqueous oxalic acid solution is added with the mixture of the barium chloride solution and the titanium chloride solution. Preferably, the solution mixture is added at a rate of 5–5,000 ml/min with the molar ratio of oxalic acid to titanium maintained in the range of 1.0 to 5.0. It is preferable that the aqueous oxalic acid solution is stirred at 10–1,000 rpm/min.

Conventional processes may be applied for aging, washing and drying of the precipitate. The aging is preferably conducted for 1–100 hours. As for the drying, it is carried out at 50–200° C.

Next, the pure barium titanyl oxalate thus obtained is primarily calcined, followed by primary pulverization. The primary calcination is preferably carried out at 500–1,100° C. With the aid of a dry or wet pulverizer, the calcined precipitate is broken down into particles with a mean size of 0.1–1.0 $\mu$m.

When the primary pulverization is carried out with a wet pulverizer, the resulting slurry is dried in a conventional manner, for example, by using a spray-drier.

Subsequently, secondary calcination is executed on the fine barium titanate powder, followed by secondary pulverization. The preferable temperature of the secondary calcination step falls within the range of 900 to 1,300° C. With resort to a dry or wet pulverizer, the secondary pulverization is conducted so as to give particles which have a mean size of 0.1–5.0 $\mu$m.

Figure 1:
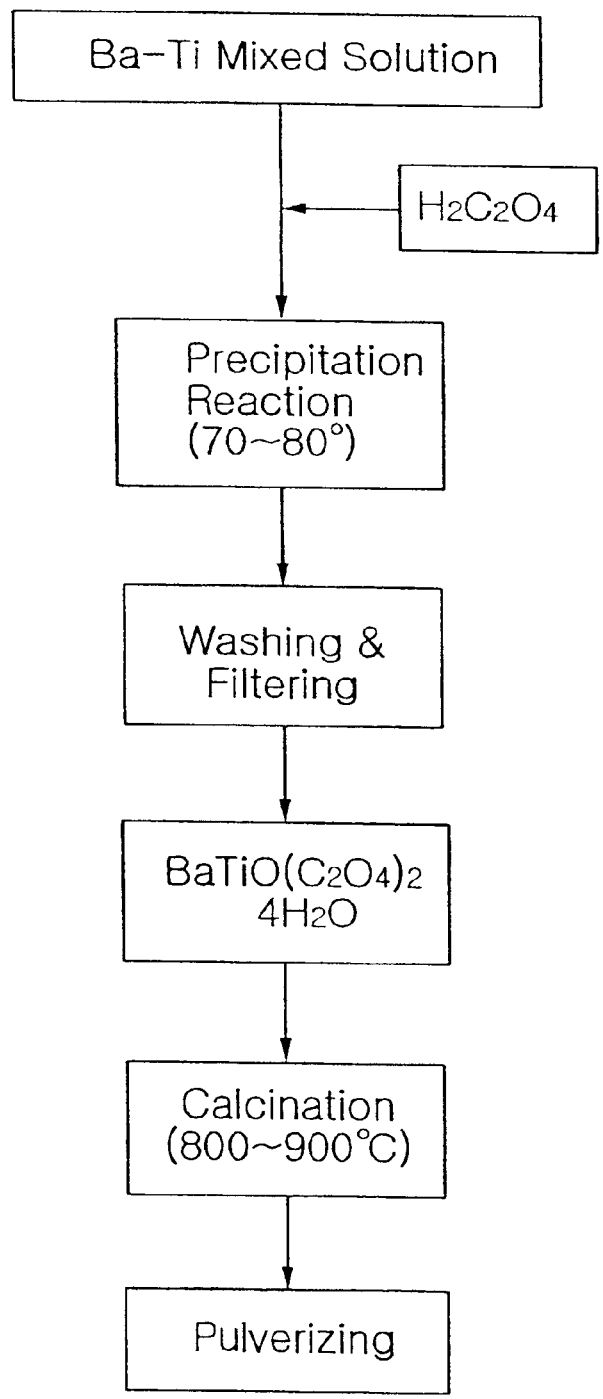
FIG. 1 is a process flow showing a conventional method for preparing barium titanate powder by oxalate synthesis.
Figure 2:
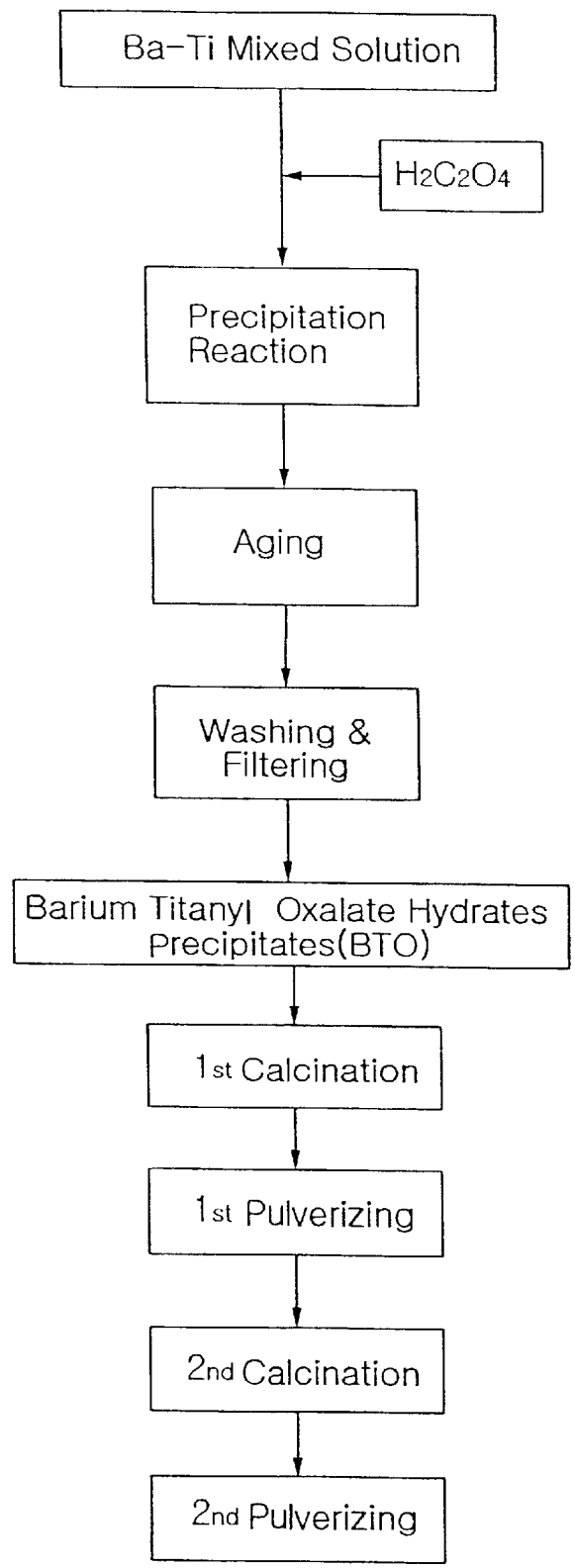
FIG. 2 is a process flow showing a method for preparing barium titanate powder by oxalate synthesis according to an embodiment of the present invention.

The above-illustrated processes for preparing barium titanate powder are illustrated in FIG. 2.

Below, a description will be given of the preparation of doped-barium titanate powder.

As the cost of precious metals such as Pd increases, many MLCC manufacturers employ base metals, such as Ni, Cu, etc., for internal electrodes, instead. However, when using base metal, extensive care must be taken. For example, a reductive atmosphere is required to prevent the oxidation of such base-metal electrodes upon sintering of MLCC. Additionally, dielectrics should have anti-reductive compositions lest the dielectric oxide is reduced in such a reductive atmosphere.

To give reductive resistance to $BaTiO_3$-based Perovskite dielectrics, ions serving as an acceptor for conductive electrons are doped while donor ions are provided for charge compensation under the condition of A/B ratio >1. In fact, Hennings et al., reported that the addition of donors and acceptors to $BaTiO_3$ Perovskite dielectrics significantly improves dielectric properties and reliability in base-metal electrode MLCC ["Donor-Acceptor Charge Complex Formation in BT Ceramic", Ceramic Transactions, vol 97, p 41].

Further, the dielectric properties are also dependent on the method of doping such dopants onto $BaTiO_3$. It is disclosed that better dielectric properties can be obtained when doping onto $BaTiO_3$ powder dopants in oxide forms, rather than in a co-precipitation manner ["Influence of the Doping Method on X7R Based-$BaTiO_3$ Capacitors", J. F. Fernandez et al., vol. 127, pp47–52 (1992)]. Also, they specifically mentioned that the improvement of dielectric characteristics according to the doping method is attributed to better distribution of dopants. According to another article, $Ba(Ti_{1-x}Mn_x)O_3$, which is prepared by doping Mn ions upon synthesis of $BaTiO_3$, is superior to that prepared by doping $MnCO_3$ onto $BaTiO_3$ in many dielectric characteristics ["Dielectric properties of MnO-Doped $BaTiO_3$ for Ni Electrode MLCCs", Takeshi Masuda et al., Program summary and extended abstract, The $9^{th}$ US-Japan Seminar on Dielectric and Piezoelectric Ceramics. Pp 353–355, Nov. 2–5, 1999].

In the present invention, therefore, acceptor and donor ion sources are added in a form of oxides, hydroxides, carbonates, nitrides, sulfonates, or salts to a solution mixture of $BaCl_2$ and $TiCl_4$, after which the resulting dopant element-containing solution mixture is mixed with an aqueous oxalic acid solution to precipitate barium titanyl oxalate doped uniformly with the ions of interest.

In detail, the preparation of doped-barium titanate powder of the present invention starts with the preparation of a dopant element-containing solution mixture. In this regard, at least one dopant, capable of serving as a donor or acceptor, selected from the group consisting of Y, La, V, Nb, Ta, Cr, Mo, W, Mn, Fe, Co, Rh, Ni, Cu, Zn, Ga and rare-earth elements is added in a form of oxides, hydroxides, carbonates, nitrides, sulfates or salts to a mixture of an aqueous barium chloride solution and an aqueous titanium chloride solution. The dopant element-containing solution mixture is stirred to clarity.

Preferably, each dopant is added in an amount of 10 mol % or less based on the mole of titanium.

Afterwards, the dopant element-containing solution mixture is added to an aqueous oxalic solution to give doped-barium titanyl oxalate (BTO) as a precipitate when is then aged, washed, filtered and dried.

Subsequently, the doped-barium titanyl oxalate is primarily calcined, followed by primary pulverization to produce fine doped-barium titanate powder.

Next, secondary calcination is executed on the fine doped-barium titanate powder, followed by secondary pulverization.

The primary calcination, primary pulverization, secondary calcination and secondary pulverization for doped-barium titanate powder are respectively conducted in the same manner as in the preparation of barium titanate.

Figure 3:
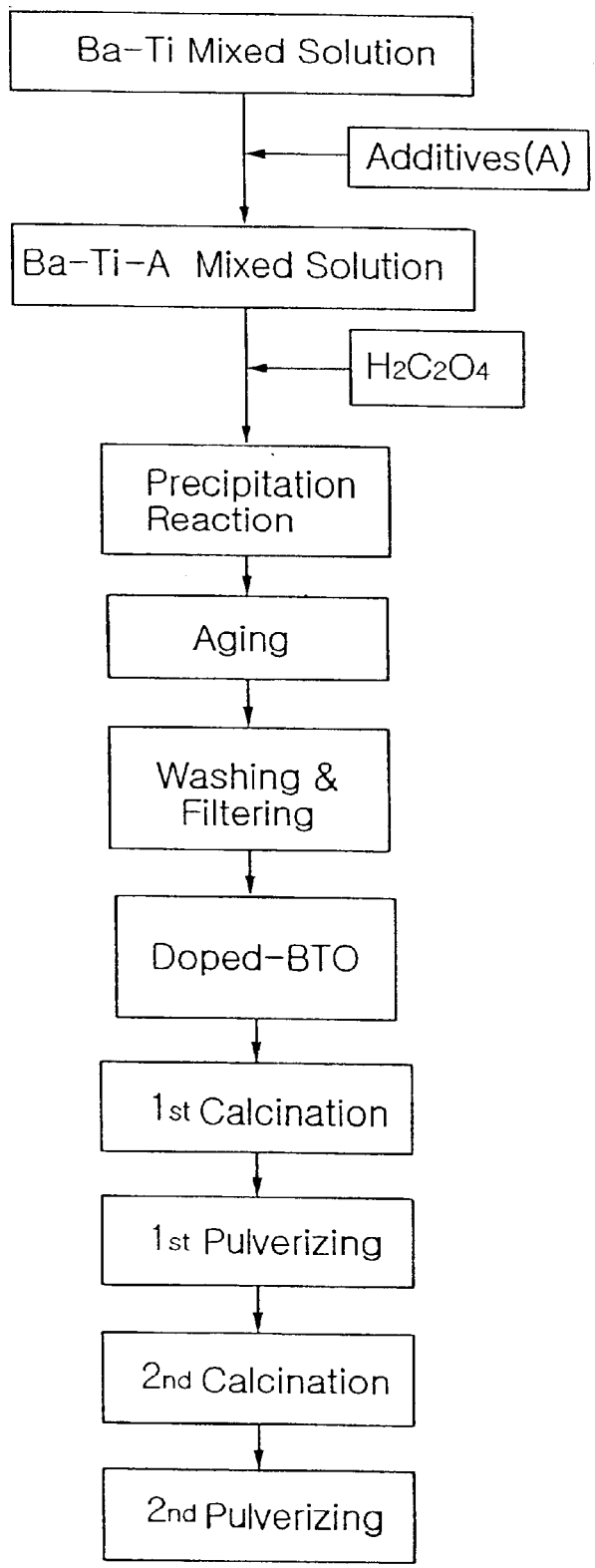
FIG. 3 is a process flow showing a method for preparing doped-barium titanate powder by oxalate synthesis according to another embodiment of the present invention.

The above-illustrated processes for preparing doped-barium titanate powder are illustrated in FIG. 3.

A better understanding of the present invention may be obtained in light of the following examples which are set forth to illustrate, but are not to be construed to limit the present invention.

EXAMPLE 1

A mixture of an aqueous titanium chloride solution (0.50 mol/0.50 L) and an aqueous barium chloride solution (0.55 mol/0.55 L) was dropwise added at a rate of 10 ml/min to an aqueous oxalic acid solution (1.25 mol/1.25 L) maintained at 80° C. with vigorous stirring. After completion of the addition, the resulting solution was slowly cooled to room temperature and allowed to stand for 5 hours. The barium titanyl oxalate precipitate thus obtained was well washed with pure water and filtered, followed by primary calcination at 900° C. in an electric furnace.

Figure 4A:
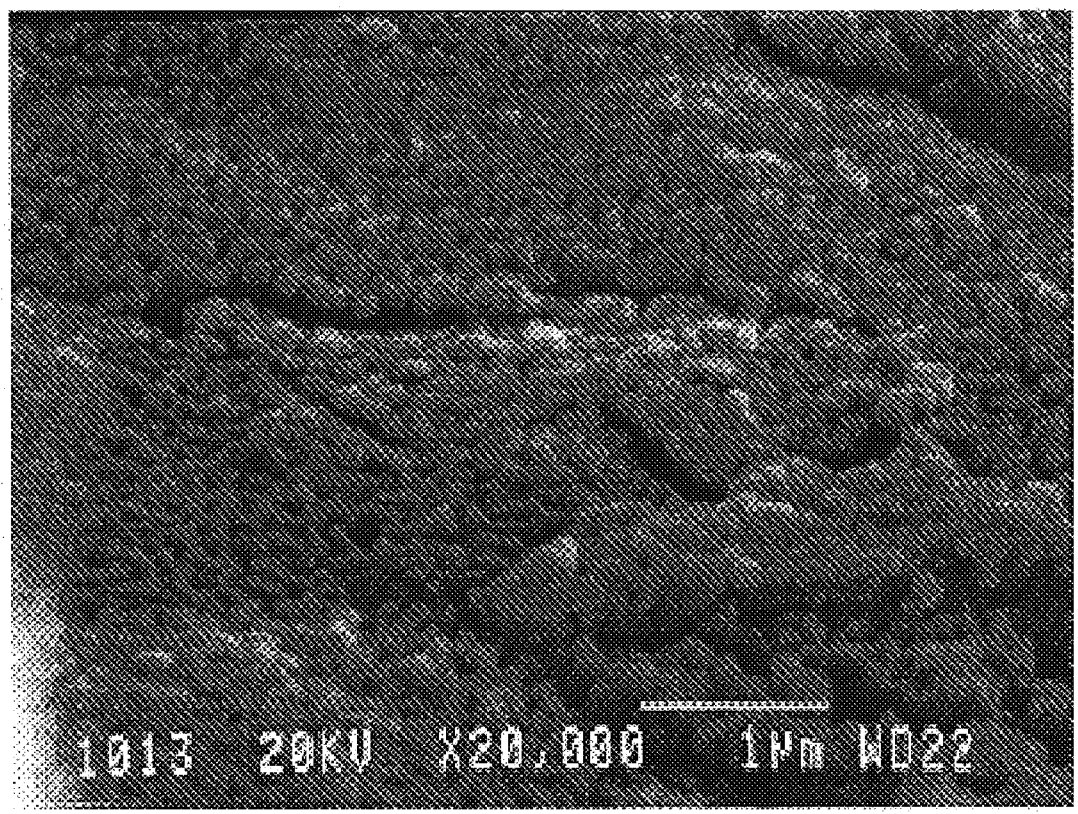
FIG. 4a is a SEM photograph showing the doped-barium titanate powder obtained after the primary calcination according to an embodiment of the present invention.

A SEM photograph of the barium titanate after the primary calcination is shown in FIG. 4a.

After being pulverized in a wet manner, the primarily calcined barium titanyl oxalate was again calcined at 1,100° C. in an electric furnace and then pulverized and dried to give barium titanate powder.

Figure 4B:
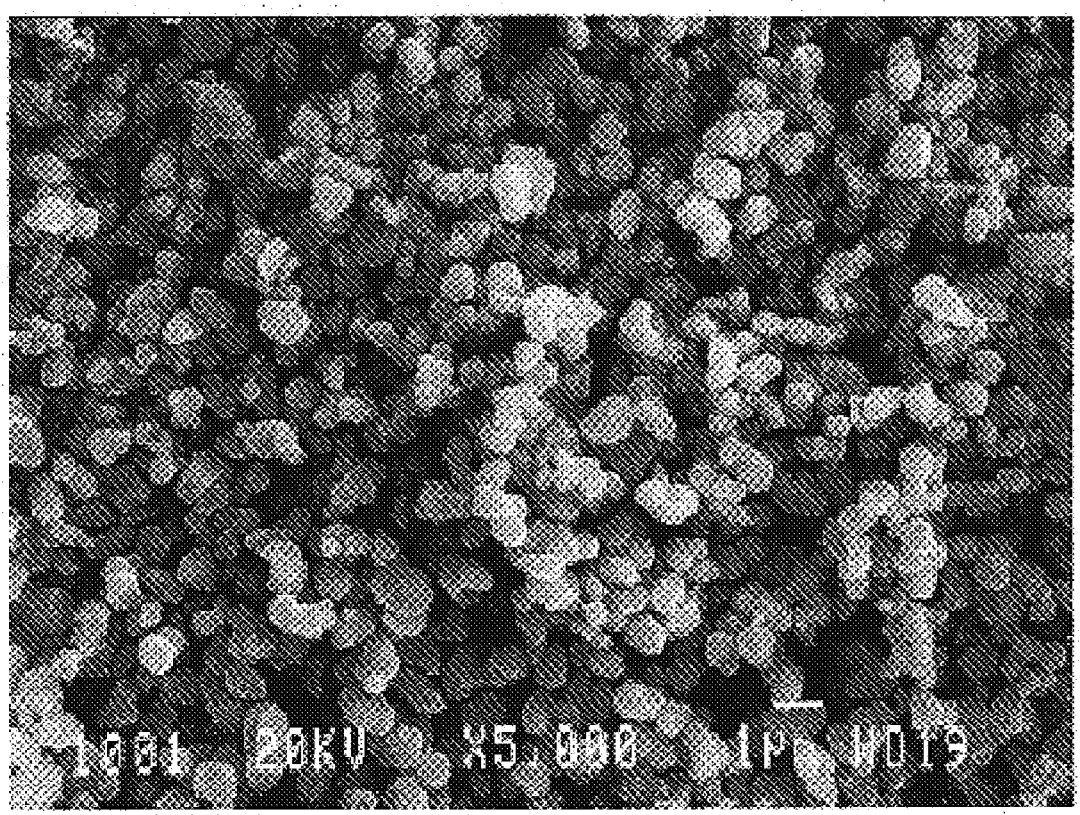
FIG. 4b is a SEM photograph showing the doped-barium titanate powder obtained after the secondary pulverization according to another embodiment of the present invention.

Referring to FIG. 4b, there is shown a SEM photograph of the barium titanate powder.

As seen in FIG. 4, the barium titanate powder prepared according to the present invention is globular with a uniform particle size distribution and has little aggregation phase.

A measurement was made of the properties of the powder and the results are given in Table 1, below.

TABLE 1

| Characteristic | Value | Method |
|---|---|---|
| Ba/Ti mol ratio | 0.998 | XRF |
| Specific surface area | 2.23 | BET |
| Particle Size | | |
| $D_{10}$ (μm) | 0.42 | Particle Size |
| $D_{50}$ (μm) | 0.72 | Analyzer |
| $D_{90}$ (μm) | 1.16 | |
| $D_{100}$ (μm) | 1.80 | |
| c/a | 1.0105 | XRD (2θ = 44°–46° |
| Moisture (wt %) | 0.20 | at 200° C., 20 min. |
| Ignition Loss (%) | 0.55 | 1050° C. × 2 hr |
| Bulk Density (g/mL) | 0.96 | |

EXAMPLE 2

The procedure of Example 1 was conducted, with the modification that 0.0005 moles of manganese chloride was completed dissolved in the Ba/Ti solution mixture, to prepare a doped-barium titanate powder. This powder was measured for dielectric properties. In this regard, the powder was mixed with a binder and other additives such as sintering aid in an organic solvent to give a slurry. After tape-casting, the slurry was coated with an Ni electrode in a screen printing process and layered to 40 stories. The multilayer structure was compressed and cut into green chips which were then sintered at 1,300° C. in a reductive atmosphere and finally subjected to termination and plating processes to produce MLCCs.

The MLCCs were measured for dielectric properties and the results are given in Table 2, below.

TABLE 2

| Characteristic | Value |
|---|---|
| Density (g/cm$^3$) | 5.81 |
| Capacitance (nF) | 97.16 |
| Dissipation Factor (%) | 1.48 |
| Insulation Resistance (10$^3$ MΩ) | 3.30 |
| Temp. Coeffi. (%) (−55° C. to 125° C.) | −7.99~0 |

As apparent in Table 2, the MLCC made of the barium titanate powder prepared according to the present invention exhibits excellent dielectric properties and satisfies the X7R spec. of the EIA specification.

Over conventional solid phase synthesis and liquid phase synthesis such as hydrothermal synthesis and sol-gel synthesis, the present invention, as described hereinbefore, has the advantage of being simple in process, requiring low material cost and low investment for facilities, showing high productivity and yield and producing powder with excellent powder properties.

According to the present invention, the barium titanate powder can be made to have a Ba/Ti ratio of 0.999±0.002 with reliability. Additionally, the barium titanate power is globular with a uniform particle size distribution and has little aggregate phase. Thus, the powder size is completely controlable.

Additionally, dopants of interest can be uniformly doped upon co-precipitation of Ba and Ti to give barium titanate powder capable of improving various dielectric properties, thereby allowing the production of the MLCCs satisfying the X7R spec.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing barium titanate by oxalate synthesis, comprising the steps of:

adding an aqueous barium chloride solution and an aqueous titanium chloride solution to an aqueous oxalic acid solution to give barium titanyl oxalate as a precipitate, aging, washing, filtering and drying the precipitate;

primary calcination of the barium titanyl oxalate, followed by primary pulverization to form fine barium titanyl powder; and secondary calcination of the fine barium titanyl powder, followed by secondary pulverization.

2. The method as set forth in claim 1, wherein the aqueous barium chloride solution, the aqueous titanium chloride solution, and the aqueous oxalic acid solution range, in concentration, from 0.2 to 2.0 mol/l, from 0.2 to 2.0 mol/l, and from 0.2 to 5.0 mol/l, respectively.

3. The method as set forth in claim 1, wherein the adding step is carried out in such a way that the molar ratios of barium chloride to titanium chloride are in the range of 0.90–1.50 and the molar ratios of oxalic acid to titanium chloride are in the range of 1.0–5.0.

4. The method as set forth in claim 1, wherein the adding step is carried out by dropping a mixture of the aqueous barium chloride solution and the aqueous titanium chloride solution at a rate of 5–5,000 mL/min to the aqueous oxalic acid solution.

5. The method as set forth in claim 1, wherein the aqueous oxalic acid solution is maintained at 30–100° C.

6. The method as set forth in claim 1, wherein the primary calcining step and the secondary calcining step are carried out at 500–1,100° C. and at 900–1,300° C., respectively.

7. The method as set forth in claim 1, wherein the barium titanyl oxalate is broken down into a mean particle size of 0.1–1.0 μm upon the primary pulverizing step and into a mean particle size of 0.1–5.0 μm upon the secondary pulverizing step.

8. A method for preparing barium titanate by oxalate synthesis, comprising the steps of:

dissolving at least one donor or acceptor in a mixture of an aqueous barium chloride solution and an aqueous titanium chloride solution to give a dopant element-containing solution, said donor or acceptor being in a form of oxides, hydroxides, carbonates, nitrides, sulfates or salts, and being selected from the group consisting of Y, La, V, Nb, Ta, Cr, Mo, W, Mn, Fe, Co, Rh, Ni, Cu, Zn, Ga and rare-earth elements;

adding the dopant element-containing solution to an aqueous oxalic acid solution to give doped-barium titanyl oxalate as a precipitate, aging, washing, filtering and drying the precipitate;

primary calcination of the doped-barium titanyl oxalate, followed by primary pulverization to form fine doped-barium titanyl powder; and secondary calcination of the doped-fine barium titanyl powder, followed by secondary pulverization.

9. The method as set forth in claim 8, wherein the aqueous barium chloride solution, the aqueous titanium chloride solution, and the aqueous oxalic acid solution range, in concentration, from 0.2 to 2.0 mol/l, from 0.2 to 2.0 mol/l, and from 0.2 to 5.0 mol/l, respectively.

10. The method as set forth in claim 8, wherein the adding step is carried out in such a way that the molar ratios of barium chloride to titanium chloride are in the range of 0.90–1.50 and the molar ratios of oxalic acid to titanium chloride are in the range of 1.0–5.0.

11. The method as set forth in claim 8, wherein the adding step is carried out by dropping the dopant element-containing solution at a rate of 5–5,000 mL/min to the aqueous oxalic acid solution.

12. The method as set forth in claim 8, wherein the donor or acceptor is added in an amount of 10 mol % or less based on the moles of titanium.

13. The method as set forth in claim 8, wherein the primary calcining step and the secondary calcining step are carried out at 500–1,100° C. and at 900–1,300° C., respectively.

14. The method as set forth in claim 8, wherein the barium titanyl oxalate is broken down into a mean particle size of 0.1–1.0 μm upon the primary pulverizing step and into a mean particle size of 0.1–5.0 μm upon the secondary pulverizing step.

* * * * *